(12) United States Patent
Kato

(10) Patent No.: US 9,402,234 B2
(45) Date of Patent: *Jul. 26, 2016

(54) MOBILE COMMUNICATION SYSTEM, COMMUNICATION CONTROL METHOD AND A MOBILE STATION

(71) Applicant: NEC CORPORATION, Tokyo (JP)

(72) Inventor: Hidenori Kato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/009,884

(22) Filed: Jan. 29, 2016

(65) Prior Publication Data
US 2016/0150480 A1    May 26, 2016

Related U.S. Application Data

(63) Continuation of application No. 11/375,256, filed on Mar. 15, 2006.

(30) Foreign Application Priority Data

Mar. 16, 2005    (JP) .................................. 2005-74194

(51) Int. Cl.
*H04Q 11/00* (2006.01)
*H04W 52/02* (2009.01)
(Continued)

(52) U.S. Cl.
CPC .......... *H04W 52/0254* (2013.01); *H04W 60/04* (2013.01); *H04W 68/005* (2013.01)

(58) Field of Classification Search
CPC . H04W 48/18; H04W 52/0254; H04W 60/04; H04W 68/005; H04W 88/06
USPC ........................................................ 370/260
See application file for complete search history.

(56) References Cited

U.S. PATENT DOCUMENTS

| 5,828,949 A | 10/1998 | Silver et al. |
| 6,289,096 B1 | 9/2001 | Suzuki |
| 6,678,533 B1 | 1/2004 | Karapetkov et al. |

(Continued)

FOREIGN PATENT DOCUMENTS

| CN | 1231805 A | 10/1999 |
| JP | 4-242330 A | 8/1992 |

(Continued)

OTHER PUBLICATIONS

"GSM Wireless Network planning and Optimization", Huawei Technologies Co., Ltd. Published, Jun. 30, 2004, First Edition. pp. 54-56.

(Continued)

*Primary Examiner* — Dang Ton
*Assistant Examiner* — Ryan Kavleski
(74) *Attorney, Agent, or Firm* — Sughrue Mion, PLLC

(57) ABSTRACT

The present invention is to provide the mobile communication system which enables power consumption reduction for the mobile station with dual mode capability by unifying the location registration and paging processing for every mobile communication system. The mobile communication system is so arranged to perform location registration processing and paging processing for the mobile station by only one of radio communication systems. And the mobile station can access to any other radio communication systems.

28 Claims, 9 Drawing Sheets

(51) Int. Cl.
*H04W 68/00* (2009.01)
*H04W 60/04* (2009.01)

(56) References Cited

U.S. PATENT DOCUMENTS

| | | | |
|---|---|---|---|
| 6,868,270 B2* | 3/2005 | Dent | H04B 7/18545 455/435.1 |
| 6,912,230 B1* | 6/2005 | Salkini | H04B 7/18563 370/466 |
| 7,366,516 B1 | 4/2008 | Oh et al. | |
| 8,014,368 B2* | 9/2011 | Kim | H04W 84/22 370/338 |
| 2002/0046277 A1 | 4/2002 | Barna et al. | |
| 2002/0126651 A1 | 9/2002 | Ikeda et al. | |
| 2003/0031150 A1 | 2/2003 | Yukie | |
| 2004/0240441 A1 | 12/2004 | Sriram | |
| 2005/0090259 A1 | 4/2005 | Jain et al. | |
| 2005/0143143 A1* | 6/2005 | Schwartz | H04W 48/20 455/574 |
| 2005/0159153 A1* | 7/2005 | Mousseau | H04W 36/0066 455/432.1 |
| 2005/0169171 A1 | 8/2005 | Cheng et al. | |
| 2005/0272424 A1 | 12/2005 | Gallagher et al. | |
| 2006/0040681 A1 | 2/2006 | Julka et al. | |
| 2006/0083212 A1 | 4/2006 | Colban et al. | |
| 2007/0093201 A1 | 4/2007 | Hsu et al. | |
| 2008/0132228 A1 | 6/2008 | Mousseau et al. | |
| 2009/0082012 A1 | 3/2009 | Gallagher et al. | |

FOREIGN PATENT DOCUMENTS

| | | |
|---|---|---|
| JP | 9-233547 A | 9/1997 |
| JP | 2000-236581 A | 8/2000 |
| JP | 2003-009239 A | 1/2003 |
| JP | 2003-169379 A | 6/2003 |
| JP | 2004-32337 A | 1/2004 |
| JP | 2004-253961 A | 9/2004 |
| JP | 2004-297459 A | 10/2004 |
| JP | 2004-297490 A | 10/2004 |
| JP | 2004-320726 A | 11/2004 |
| JP | 2004-336384 A | 11/2004 |
| WO | 01/10150 A1 | 2/2001 |

OTHER PUBLICATIONS

Communication dated Jun. 7, 2011, issued by the Japanese Patent Office in counterpart Japanese Application No. 2008-018450.
Communication dated Nov. 15, 2011, issued by the Japanese Patent Office in counterpart Japanese Application No. 2008-018450.
Office Action dated Apr. 9, 2013 issued by the Japanese Patent Office in corresponding Japanese Patent Application No. 2012-027909.

* cited by examiner

MOBILE COMMUNICATION SYSTEM, COMMUNICATION CONTROL METHOD AND A MOBILE STATION

CROSS REFERENCE TO RELATED APPLICATIONS

This application is a Continuation of U.S. patent application Ser. No. 11/375,256, filed Mar. 15, 2006, which claims priority from Japanese Patent Application No. 74194/2005 filed Mar. 16, 2005, the disclosures of which are incorporated herein by reference in their entirety.

BACKGROUND OF THE INVENTION

1. Field of the Invention

The present invention relates to a mobile communication system, communication control method and a mobile station, and particularly relates to improvement of the mobile communication system which uses the mobile station as dual mode terminal equipment and can realize the dual mode communications in different radio communication systems.

2. Description of the Related Art

In recent years, in a mobile communication system represented by the cellular phone system, users are increasing sharply by its convenience, and also with respect to a communication method used for the mobile communication system, a wide variety of radio communication systems are proposed and put in practical use.

In these circumstances, there is a mobile station of what is called dual mode terminal equipment, which has a capability of communicating in a plurality of communication systems, and technologies of such a dual mode mobile station are disclosed in several Japanese patent documents.

The mobile station of dual mode terminal equipment indicated by JP, 2004-032337, A is that the mobile station usually operates with the radio base station of a time division multiple access (TDMA) system and during a standby state, it receives the positioning information from the GPS (Global Positioning System) and searches a database based on the position information, and if it finds the radio base station of a code division multiple access (CDMA) system exists near the mobile station and radio transmission condition is better than the TDMA system, the mobile station changes the radio base station from the TDMA system to the CDMA system for communication.

The mobile station of dual mode terminal equipment indicated by JP, 2004-297459, A is that the mobile station changes over mobile communication systems in accordance with the surrounding radio environment where the mobile station is placed, and the mobile station has a function of measuring received electric field level of radio signals from other mobile communication system when the received electric field level of radio signals from the current mobile communication system having degraded by a fixed threshold level. By this function, a changeover of communication systems can be smoothly performed from one mobile communication system to other communication system.

The mobile station of dual mode terminal equipment indicated by JP, 2004-297490, A is the mobile station with dual mode operation for mobile IP with respective radio equipments for a wireless LAN and a cellular phone network, and performs the data communications in mobile environments. In this technology, an IP address assigned by each network is managed to identify the same mobile station. Therefore, a home agent manages the IP address in each network with the combination of the mobile station identification and the radio equipment identification, and allows the mobile station to communicate in the different networks flexibly.

The conventional mobile station with dual mode capability needs registration of its location in a plurality of mobile communication systems because it should perform standby operation of waiting for a call from respective networks, and for this purpose, it performs intermittent reception of paging messages from respective networks as the standby operation. Therefore, the mobile station with dual mode capability requires bigger power consumption during the standby state compared with conventional mobile station (with a single mode capability), and it causes a problem that a battery of the mobile station with dual mode capability does not last longer than conventional mobile station.

SUMMARY OF THE INVENTION

The purpose of the present invention is to provide the mobile communication system which enables power consumption reduction for the mobile station with dual mode capability by unifying the location registration and paging processing for every mobile communication system.

The mobile communication system according to the present invention includes a plurality of different radio communication systems in a service area of the mobile communication system, and a mobile station with dual mode capability which can communicate with any of the plurality of different radio communication systems.

And, the mobile communication system according to the present invention comprises two types of control equipment. One is a first control equipment, which is provided in one of the radio communication systems, and processing operations of a location registration and a paging processing for the mobile station are dedicated by this first control equipment. Another is a second control equipment, which is provided in any of the radio communication systems, and performs several call processing operations. The second control equipment finds out the radio communication system for requesting the paging processing for a received call, transmits a call request message to the first control equipment provided in the radio communication system having been found, and performs radio channel preparation and authentication processing for the mobile station which has responded to the paging processing of the first control equipment.

The mobile station, according to the present invention, has a capability to select one of the radio communication systems when the mobile station has received a paging message transmitted by the paging processing of the first control equipment, and to transmit a radio channel connection request to the second control equipment in the selected radio communication system for requesting connection access through the selected radio communication system for receiving the call.

According to the present invention, since it is enough for the mobile station with dual mode capability, which is used in a plurality of radio communication systems, to perform location registration processing and paging processing to only one of radio communication systems, power-savings for a battery in the mobile station can be realized.

According to the present invention, since location registration processing and paging processing which should usually be performed by each radio communication network are handled by a particular radio communication system, the radio communication network, which is not required for performing location registration processing and paging processing, can be constructed with a simple system, without incorporating location registration processing and paging processing.

BRIEF DESCRIPTION OF THE DRAWINGS

Exemplary features and advantages of the present invention will become apparent from the following detailed description when taken with the accompanying drawings in which.

DESCRIPTION OF THE EXEMPLARY EMBODIMENTS

An exemplary embodiment of the present invention and various advantages of the present invention will be explained in detail below, with reference to drawings.

Figure 1:
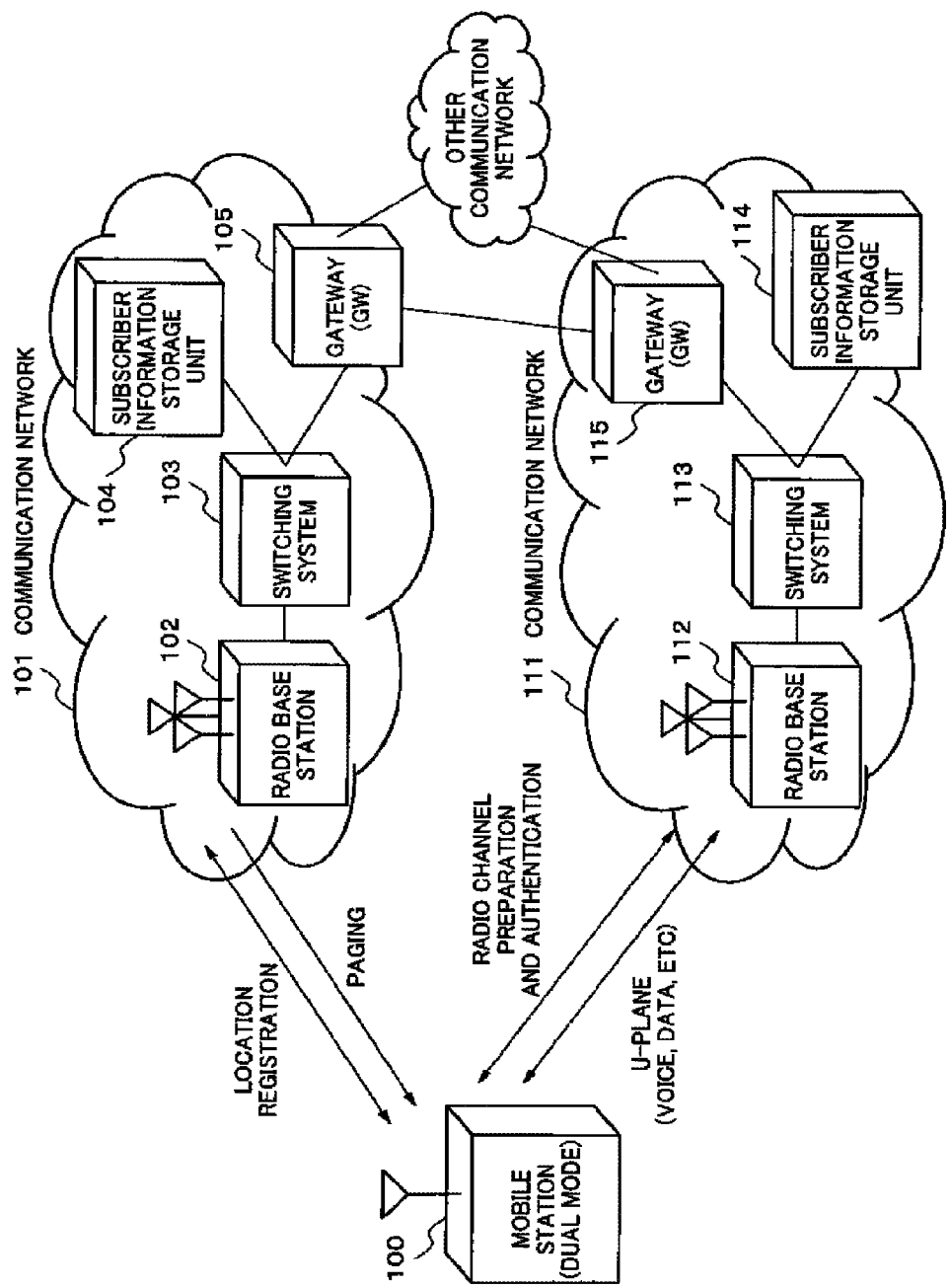
FIG. 1 is a figure showing an example of a system block diagram according to an exemplary embodiment of the present invention is applied.

FIG. 1 is a system block diagram according to the exemplary embodiment of the present invention.

In FIG. 1, a mobile station 100 is dual mode terminal equipment, and communication networks 101, 111 are different kind of communication systems respectively. The communication network 100 can be one of systems of the present mobile communication systems, such as W-CDMA, cdma2000, cdmaOne, GSM, AMPS, PDC, PHS, etc., which has functions to perform location registration and paging processing necessary for mobile communications control. The communication network 111 can be one of systems of present. W-LAN, a cordless telephone, and present mobile communication systems, such as W-CDMA, cdma2000, cdmaOne, GSM, PDC, PHS, etc., which has a radio channel control function. Here, each of the communication networks 101, 111 is not limited to the communication system listed above, and may be new mobile communication systems by the next generation.

The communication network 101 has a radio base station 102, a switching system 103, a subscriber information storage unit 104, and a gateway (GW) 105. The communication network 111 has a radio base station 112, a switching system 113, a subscriber information storage unit 114, and a gateway (GW) 115. The communication networks 101 and 111 are connected each other via respective gateways 105, 115, and also they are connected with other communication networks 121. Location based relation between each of service areas of communication networks 101 and 111 is shown in FIG. 8 (*a*). As shown in FIG. 8 (*a*), it is assumed that service area 300 of communication network. 101 includes service areas 301 of communication network 111.

Figure 9:
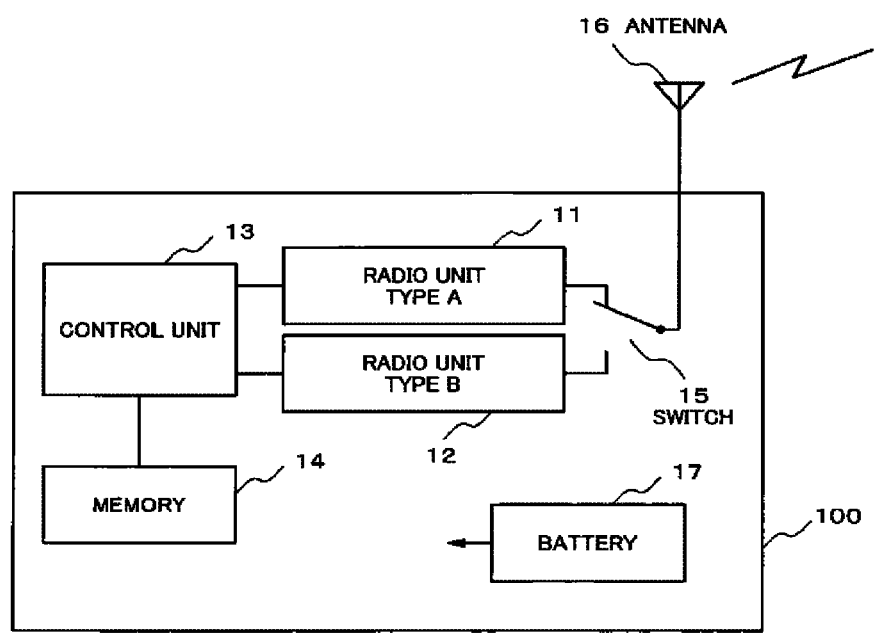
FIG. 9 is a block diagram of the mobile station with dual mode capability according to the present invention.

FIG. 9 is a block diagram of the mobile station 100 according to the present invention. As the mobile station 100 is dual mode terminal equipment, it can communicate with respective communication networks 101, 111 using respective radio unit type A 11 and type B 12. However, the mobile station 100 only performs location registration processing to the communication network 101, and it does not perform location registration processing to the communication network 111. Furthermore, the mobile station 100 will be in the standby state for paging processing for the communication network 101, but the paging processing is not performed for the communication network 111.

When the mobile station 100 has received a paging message for call termination from the communication network 101, it can requests for radio channel connection to the communication network 111, and after having performed an authentication processing at the communication network 111, it starts transmission and reception of user data (voice and data) for the call through the communication network 111. However, if the mobile station 100 locates at the outside of service area of the communication network 111, the mobile station 100 requests for radio channel connection and the authentication processing to the communication network 101, and then, performs transmission and reception of user data for the call through the communication network 101. Those processing operations of the mobile station 100 mentioned above are performed by a control unit 13 and information contained in a memory 14 of the mobile station 100.

The communication network 101 performs the paging processing to the mobile station 100 according to a call request from the communication network 111 based on the contents of location registration carried out beforehand.

The communication network 111 performs radio channel preparation and authentication processing according to the radio channel connection request from the mobile station 100, and provides communication channel for transmission and reception of user data for the call. Here, in the communication network 111, as foregoing description, the paging processing is not carried out, but, processing of those other than paging are performed in the same manner as the present processing of mobile communication system.

According to the present invention, the call termination to the mobile station 100 through other communication networks is realized, even though the mobile station 100 performs the location registration processing and the standby operation of paging reception with only a particular communication network (here, communication network 101). Therefore, it is possible to perform the standby operation of paging reception by the same power consumption as the single mode operation.

With reference to FIG. 1, an exemplary embodiment of the present invention will be explained in detail.

In FIG. 1, the mobile station 100 has the following functions.

The function to perform the location registration processing to a predetermined communication network (here, it is the communication network 101), the function to perform the standby operation of paging reception from the communication network 101, the function to select the optimal communication network after paging reception, the function to request radio channel connection to the selected communication network (for example, communication network 111), the function to negotiate the communication network 111 of the authentication processing for network access, and the function to perform user data transmission and reception through the communication network 111.

If the mobile station 100 is located outside the service area of the communication network which has been selected as the optimal communication network, it has the function to request radio channel to another communication network.

The mobile station. 100 as dual mode terminal equipment is not limited to be used for two communication networks, it is also possible to be use for more than two communication networks. And having a function of the location registration processing and the standby operation of paging reception for one particular communication network, it is possible to perform the standby operation for a plurality of communication networks.

The switching system 103 of communication network 101 has the following functions.

The function to inquire about the location of the mobile station 100 to the subscriber information storage unit 104, to which the location registration has been performed by the mobile station 100 beforehand, when a call request message for the mobile terminal 100 is received from the communication network 111, the function to transmit a demand for performing paging operation for the mobile station 100 to the radio base station 102 in the area of the mobile station 100 being located, and the function to report the fact, that the demand for performing paging operation for the mobile station 100 has been completed, to the communication network 111.

The switching system 103 also has the following functions.

The function to report the fact, that it has received a radio channel connection request message after transmitting the demand for performing paging operation, to the communication network 111, the function to accept a channel connection request message transmitted from a communication network of call origination and to respond to the request message, the function to prepare a radio channel for the mobile station 100 and to perform the authentication processing, and the function to provide communication channel for transmission of End to End signaling messages and user data Those functions of switching system 103 may be performed by other node in the communication network 101, and also it may be possible to provide a plurality of other nodes, each having a part of functions of switching system 103 respectively.

The switching system 113 of communication network ill has the following functions.

The function to inquire about the communication network for call destination to the subscriber information storage unit 114 when a call request message is received from other communication network 121, the function to transmit the call request message to the communication network for call destination (for example, communication network 101), the function to prepare a radio channel for the mobile station 100 and to perform the authentication processing, and the function to provide communication channel for transmission of End to End signaling messages and user data. The switching system 113 also has the function to request the communication network of a call origination to changeover the gateway connection, when it has received a reception notice of the radio channel connection request from the communication network 101.

Those functions of switching system 113 may be performed by other node in the communication network 111, and also it may be possible to provide a plurality of other nodes, each having a part of functions of switching system 113 respectively.

Detailed explanations for the radio base stations 102 and 112, the subscriber information storage units 104 and 114, and the gateways 105 and 115 are omitted, since they are known well for a person skilled in the art and the present invention is not directly related.

Next, the operation of the exemplary embodiment the present invention for the call, which has been originated from other communication network 121, and is connected with mobile station 100 using the radio channel of communication network 111, will be explained with referring to the sequence chart of FIG. 2.

Figure 2:
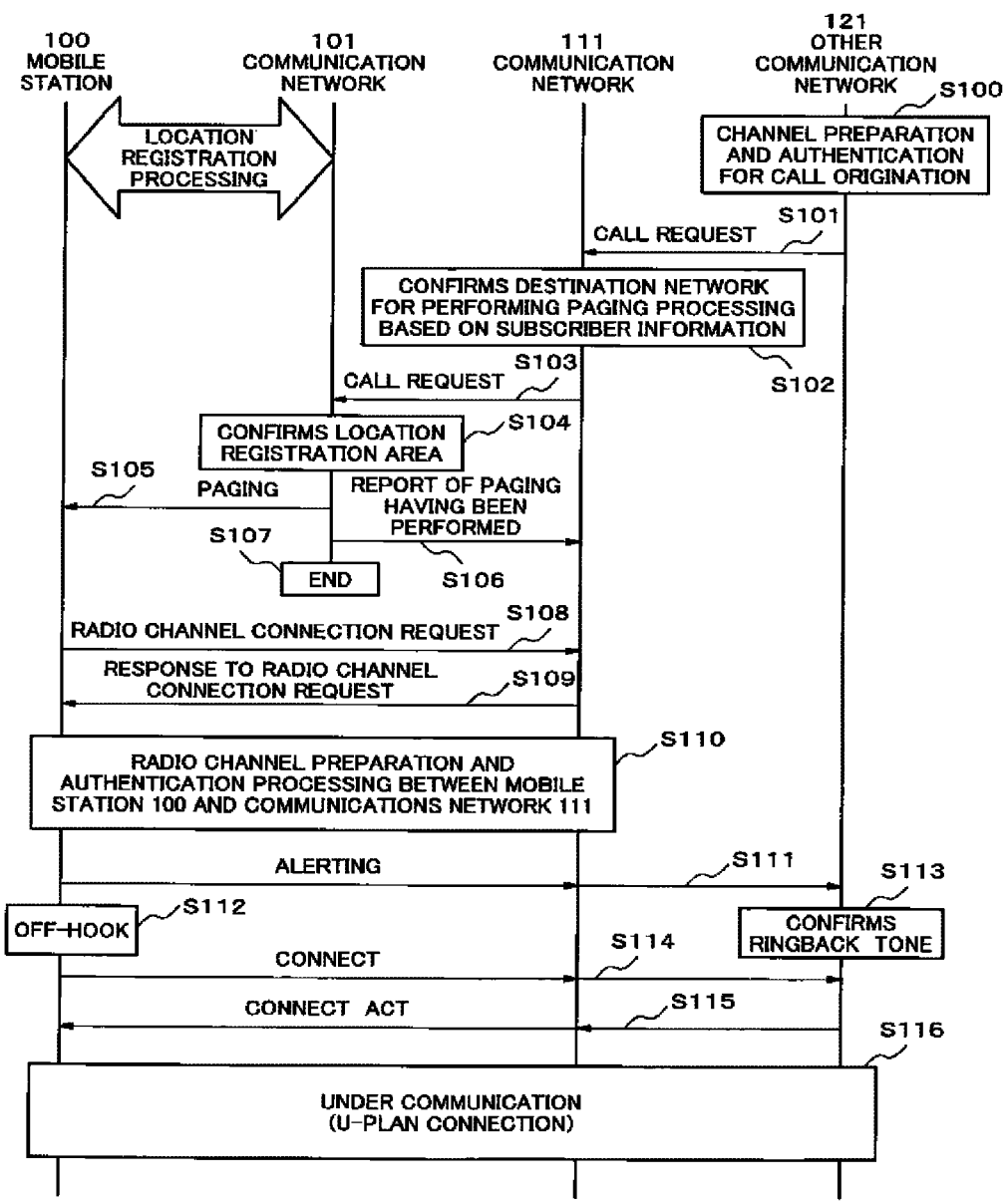
FIG. 2 is a sequence chart showing an operation of a call originated from other communication network 121, in FIG. 1, is connected with the mobile station 100 using a radio channel of the communication network 111.

In FIG. 2, other communication network 121, which has performed channel preparation and authentication processing for a call originating terminal, which is not shown in the figure (Step S100), transmits a call request message to the communication network 111 (Step S101). In the communication network 111, it confirms based on the subscriber information of the called user, i.e. the mobile station 100, included in the call request message that the communication network 101 is the destination of the call request message and the paging processing is to be performed in the communication network 101 (Step S102), and the call request message is transmitted to the communication network 101 (Step 103).

In the communication network 101, after confirming location registration area of the mobile station 100 for the call termination (Step S3104), a paging message is transmitted to the mobile station 100 in the target area (Step S105), simultaneously a report of paging having been performed is notified to the communication network 111 to tell that radio channel connection request could be transmitted from the mobile station 100 depending on the result of network selection operation in the mobile station 100 (Step S106), and the communication network 101 ends its processing (Step S107).

Upon receiving the paging message, the mobile station 100 selects an optimal communication network for the call, and if the communication network 111 is selected as the optimal network due to a reason such as cheaper communications fee or same other factors, the mobile station 100 transmits a radio channel connection request message to the communication network 111 (Step S108). In this example, information of communication fee or other factors or attributions for selecting respective communication networks shall be memorized in the memory 14 in the mobile station 100.

Upon receiving the response to radio channel connection request message from the communication network 111 (Step S109), preparation of radio channel and authentication processing are performed between the mobile station 100 and the communication network 111 (Step S110). Then, an alerting message, which indicates that the called user is being rung, is returned from the mobile station 100 to other communication networks 121 of the call origination (Step S111), and the ringback tone is confirmed by a call originating terminal (Step S113).

When the call is answered by an off-hook at the mobile station 100 (Step S112), a connect message (CONNECT) is transmitted and a response to the connect message (CONNECT ACT.) is returned (Step S115). And, End to End communication connection is established between the mobile station 100 and a call originating terminal, and transmission and reception of voice data or user data is performed through the U-plane connection (Step S116).

Next, the operation of the call, which has been originated from other communication network 121 and is connected with mobile station 100, which is not located in the service area of communication network 111, using the radio channel of communication network 101, will be explained with referring to the sequence chart of FIG. 3.

Figure 3:
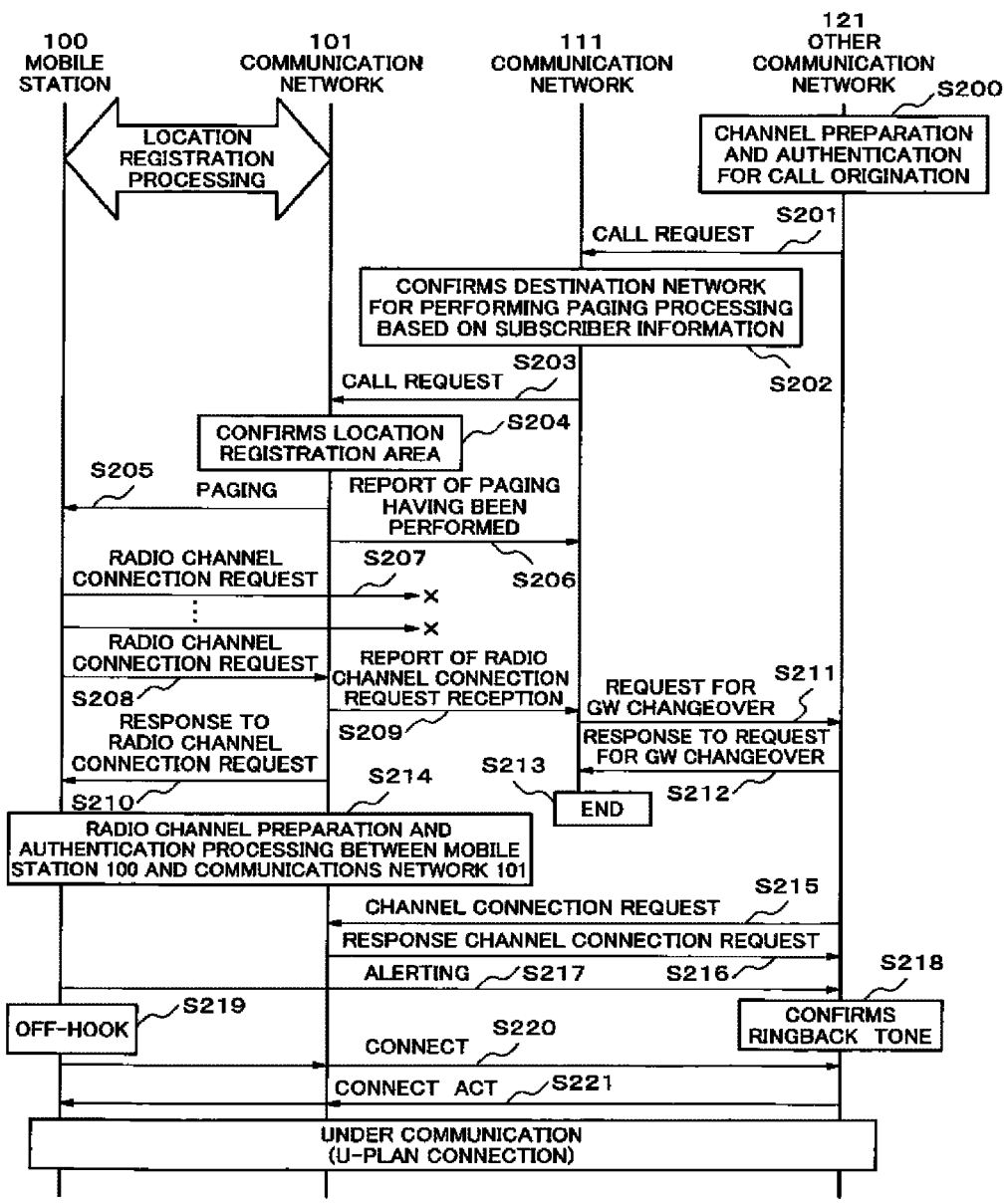
FIG. 3 is a sequence chart showing an operation of a call originated from other communication network 121, in FIG. 1, is connected with the mobile station 100 using a radio channel of the communication network 101, since the mobile station 100 is not located in the area of communication network 111.

In FIG. 3, other communication network 121, which has performed channel preparation and authentication processing for a call originating terminal, which is not shown in the figure (Step S200), transmits a call request message to the communication network 111 (Step S201).

In the communication network 111, confirms based on the subscriber information of the called user, i.e. the mobile station 100, included in the call request message that the communication network 101 is the destination of the call request message and the paging processing is to be performed in the communication network 101 (Step S202), and the call request message is transmitted to the communication network 101 (Step S203).

In the communication network 101, after confirming location registration area of the mobile station 100 for the call termination (Step S204), a paging message is transmitted to the mobile station 100 in the target area (Step S205), simultaneously a report of paging having been performed is notified to the communication network 111 to tell that radio channel connection request could be transmitted from the mobile station 100 depending on the result of network selection operation in the mobile station 100 (Step S206).

So far, the operation of call processing is same as described in FIG. 2. However, the radio channel connection request message sent from the mobile station 100, which has received the paging message, is not acknowledged by the communication network 111 because the mobile station 100 does not locate in the service area of communication network 111. As the result, the mobile station 100 repeats retransmission of the radio channel connection request message (Step S207). The mobile station 100 gives up connection with the communication network 111 after repeating retransmission of the radio channel connection request message in predetermined number of times, and the mobile station 100 transmits the radio channel connection request message to the communication network 101 (Step S208).

Upon receiving a response to the radio channel connection request message from the communication network 101 (Step S210), preparation of a radio channel and authentication processing are performed between the mobile station 100 and the communication network 101 (Step S219). On the other hand, the communication network 101 notifies the communication network 111 that it has received the radio channel connection request message (Step S209).

Upon receiving the notice from the communication network 101, the communication network 111 transmits a request for gateway changeover message to other communication network 121 (Step S211).

Other communication network 121 responds to the request for gateway changeover message to the communication network 111 (Step S212), and then, it transmits the channel connection request message to the communication network 101 for performing gateway changeover processing (Step S215). When a response to the channel connection request message is transmitted from the communication network 101, it means that the connection from other communication network 121 has changed over from the communication network 111 to the communication network 101 (Step 216).

There is no sequential order between Step S214 and Steps S215, S216, and when the processing of S214 and the processing of S216 have been completed, an alerting message is returned from the mobile station 100 to other communication networks 121 of the call origination (Step S217), and the ringback tone is confirmed by the call originating terminal (Step S218).

When the call is answered by an off-hook at the mobile station 100 (Step S219), a connect message (CONNECT) is transmitted (Step S220) and a response to the connect message (CONNECT ACT.) is returned (Step S221). And, End to End communication connection is established between the mobile station 100 and the call originating terminal, and transmission and reception of voice data or user data is performed through the ft-plane connection (Step S222). If the alerting message is transmitted from the mobile station 100 (Step S217) before completing channel connection processing between the communication network 101 and other communication networks 121 (Step S215, S216), transmission of the alerting message is suspended at the communication network 101 until the connectiOn is established (Step S215, S216).

Next, the operation of the call, which has been originated from the communication network 111, and is connected with mobile station 100 using the radio channel of communication network 111, will be explained with referring to the sequence chart of FIG. 4.

Figure 4:
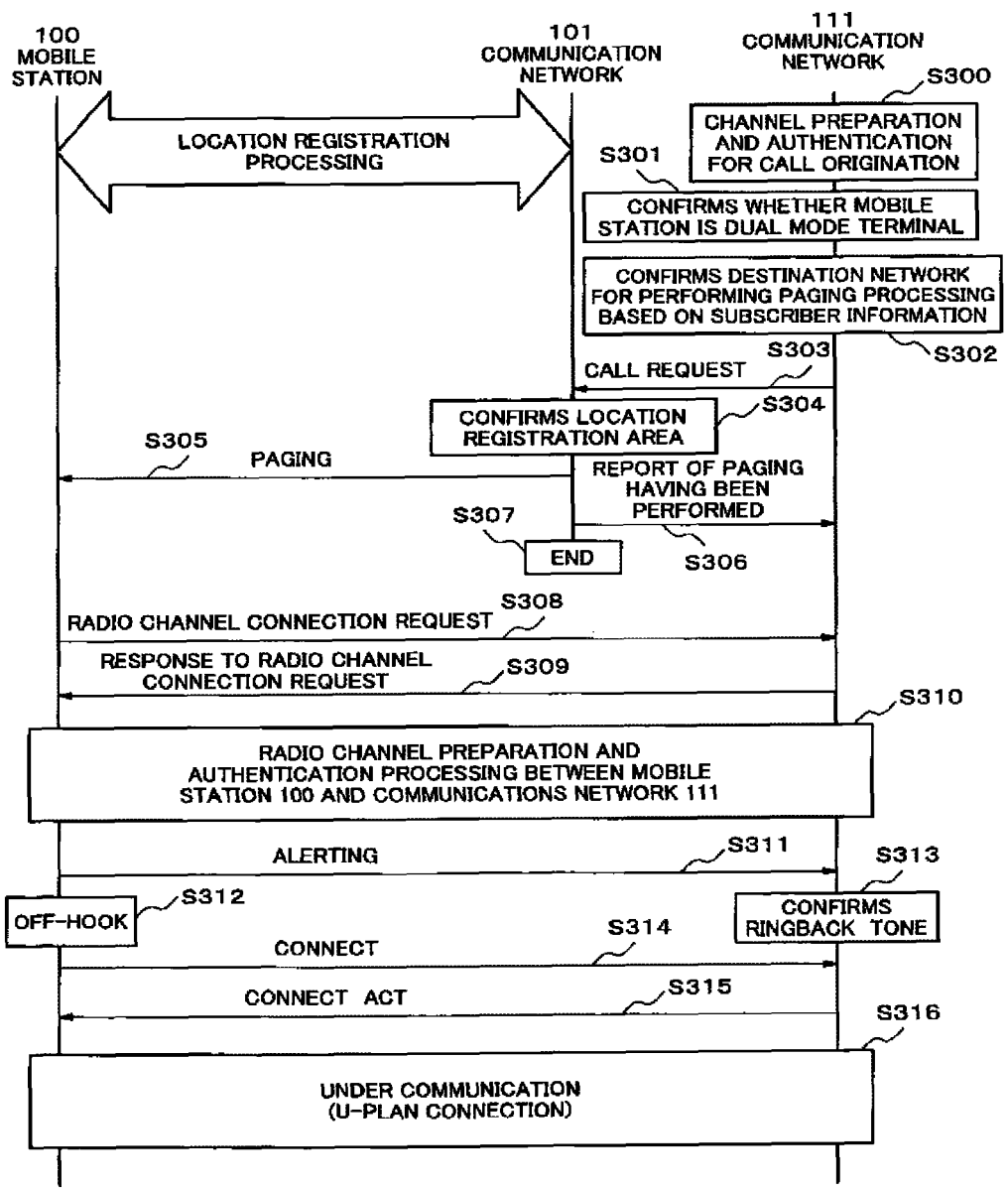
FIG. 4 is a sequence chart showing an operation of a call originated from the communication network 111, in FIG. 1, is connected with the mobile station 100 using a radio channel of the communication network ill.

In FIG. 4, channel preparation and authentication processing is performed in the communication network 111 for a call originating terminal, which is not shown in the figure (Step S300), and after that, it is confirmed based on the subscriber information of the called user, i.e. the mobile station 100, whether the mobile station 100 is a dual mode terminal equipment or not (Step S301) and also whether the communication network 101 is the network to request paging processing or not (Step S302), and then, the call request message is transmitted to the communication network. 101 (Step S303).

In the communication network 101, upon receiving the call request message, the location registration area of the mobile station 100 is confirmed (Step S304), and the paging message is transmitted to the mobile station 100 in the target area (Step S305), simultaneously a report of paging having been performed is notified to the communication network 111 to tell that radio channel connection request could be transmitted from the mobile station 100 depending on the result of network selection operation in the mobile station 100 (Step S306), and the communication network 101 ends its processing (Step S307)

When the mobile station 100 has received the paging message, it selects an optimal communication network for the call, and if the communication network 111 is selected as the optimal network due to a reason such as cheaper communications fee or other factors to select, the mobile station 100 transmits a radio channel connection request message to the communication network 111 (Step S308). In this example, information of communication fee or other factors or attributions for selecting respective communication networks shall be memorized in the memory 14 in the mobile station 100.

After the radio channel connection request message is responded by the communication network 111 (Step S309), preparation of the radio channel and authentication processing are performed between the mobile station 100 and the communication network 111 (Step S310). Then, an alerting message is returned from the mobile station 100 to the communication networks 111 (Step S311), and the ringback tone is confirmed by a call originating terminal in the communication networks ill (Step S313).

When the call is answered by an off-hook at the mobile station 100 (Step S312), a connect message (CONNECT) is transmitted and a response to connect message (CONNECT ACT.) is returned (Step S315). And, End to End communication connection is established between the mobile station 100 and the call originating terminal, and transmission and reception of voice data or user data is performed through the U-plane connection (Step S316).

If it is confirmed that the mobile station 100 for call termination is not a dual mode terminal in the Step S301, it means that the mobile terminal is not a subscriber of the communication network 111. Therefore, after requesting paging processing to the communication network concerned (here, the communication network 101), ordinary call termination processing is performed because it is not necessary for the communication network 111 to expect or wait for the radio channel connection request from the mobile terminal 100 as in the Step S308.

Next, the operation of the call, which has been originated from the communication network 101, and is connected with mobile station 100 using the radio channel of communication network 111, will be explained with referring to the sequence chart of FIG. 5.

Figure 5:
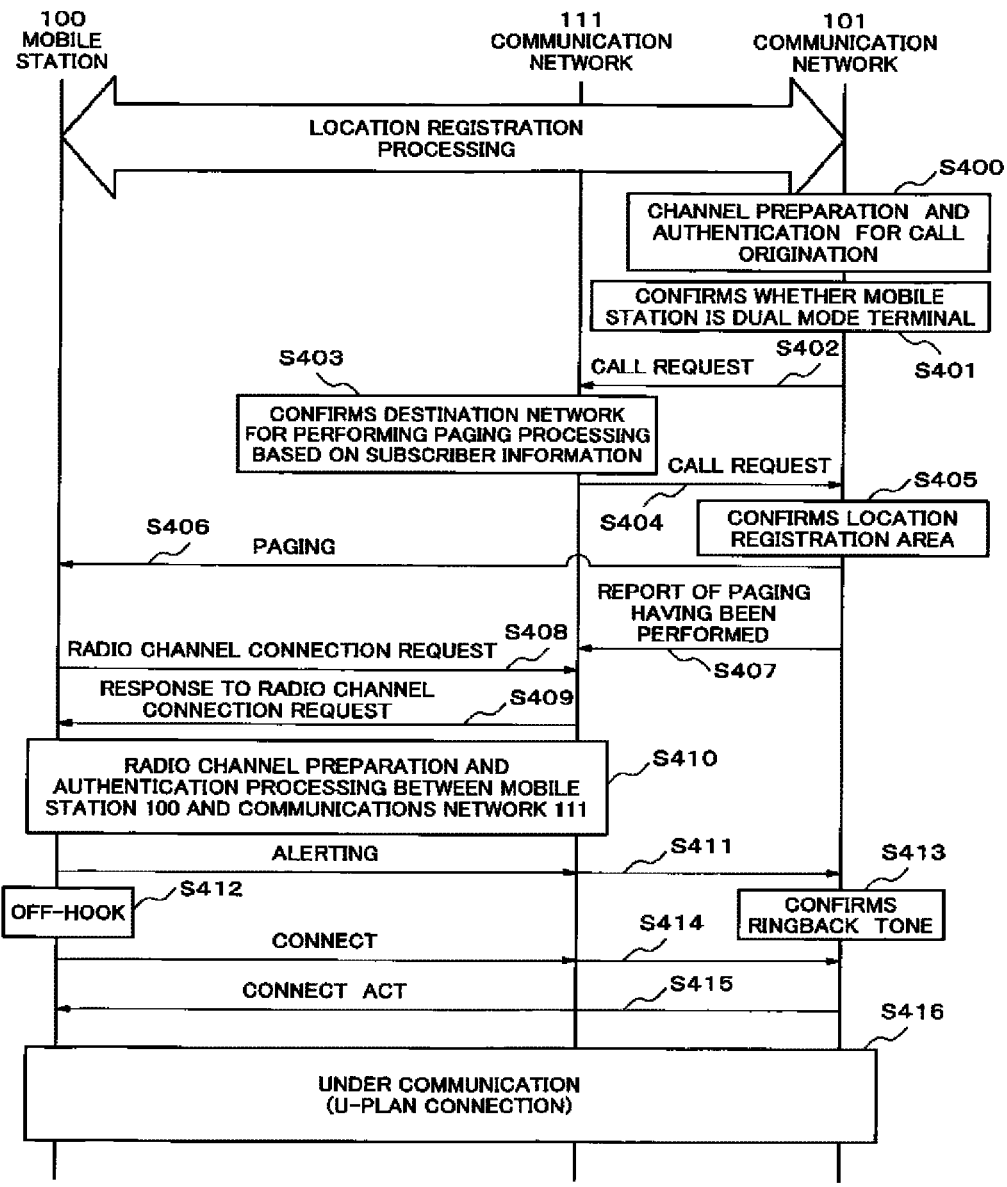
FIG. 5 is a sequence chart showing an operation of a call originated from the communication network 101, in FIG. 1, is connected with the mobile station 100 using a radio channel of the communication network 111.

In FIG. 5, channel preparation and authentication processing is performed in the communication network 101 for a call originating terminal, which is not shown in the figure (Step S400), and after that, it is confirmed based on the subscriber information of the called user, i.e. the mobile station 100, whether the mobile station 100 is a dual mode terminal equipment or not (Step S401). If the mobile station is the dual mode terminal, the call request message is transmitted to the communication network 111 (Step S402). If the mobile station is not the dual mode terminal, ordinary call termination processing will be performed in the communication network 101.

Upon receiving the call request message, the communication network ill confirms based on the subscriber information included in the call request message that the communication network 101 is the destination of the call request message and the paging processing is to be performed in the communication network 101 (Step S403), and the call request message is transmitted to the communication network 101 (Step 3404).

In the communication network 101, after confirming location registration area of the mobile station 100 (Step S405), the paging message is transmitted to the mobile station. 100 in the target area (Step S406), simultaneously a report of paging having been performed is notified to the communication network 111 (Step 407). This is to notify the communication network 111 that radio channel connection request could be transmitted from the mobile station 100 depending on the result of network selection operation in the mobile station 100.

When the mobile station 100 has received the paging message, it selects an optimal communication network for the call, and if the communication network 111 is selected as the optimal network due to a reason such as cheaper communications fee, the mobile station 100 transmits a radio channel connection request message to the communication network 111 (Step S408). In this example, information of communication fee or other factors or attributions for selecting respective communication network shall be memorized in the memory in the mobile station 100. After receiving the response to radio channel connection request message from communication network 111 (Step S409), preparation of the radio channel and authentication processing are performed between the mobile station 100 and the communication network 111 (Step S410). Then, an alerting message is returned from the mobile station 100 to the communication networks 101 of the call origination (Step S411), and the ringback tone is confirmed by a call originating terminal (Step S413).

When the call is answered by an off-hook at the mobile station 100 (Step S412), a connect message (CONNECT) is transmitted (Step S414) and a response to connect message (CONNECT ACT.) is returned (Step S415). And, End to End communication connection is established between the mobile station 100 and a call originating terminal, and transmission and reception of voice data or user data is performed through the U-plane connection (Step S416).

In this operation of the call, the call request, message is going and coming back at Steps S402 and S404 and it is apparently considered to be unnecessary. However, both-way processing of this sequence is needed because it is necessary to confirm at the communication network 111 which communication network is the target network of call processing of this call.

Another exemplary embodiment according to the present invention will be explained with referring to FIG. 6. This embodiment is an improved version in constitution.

Figure 6:
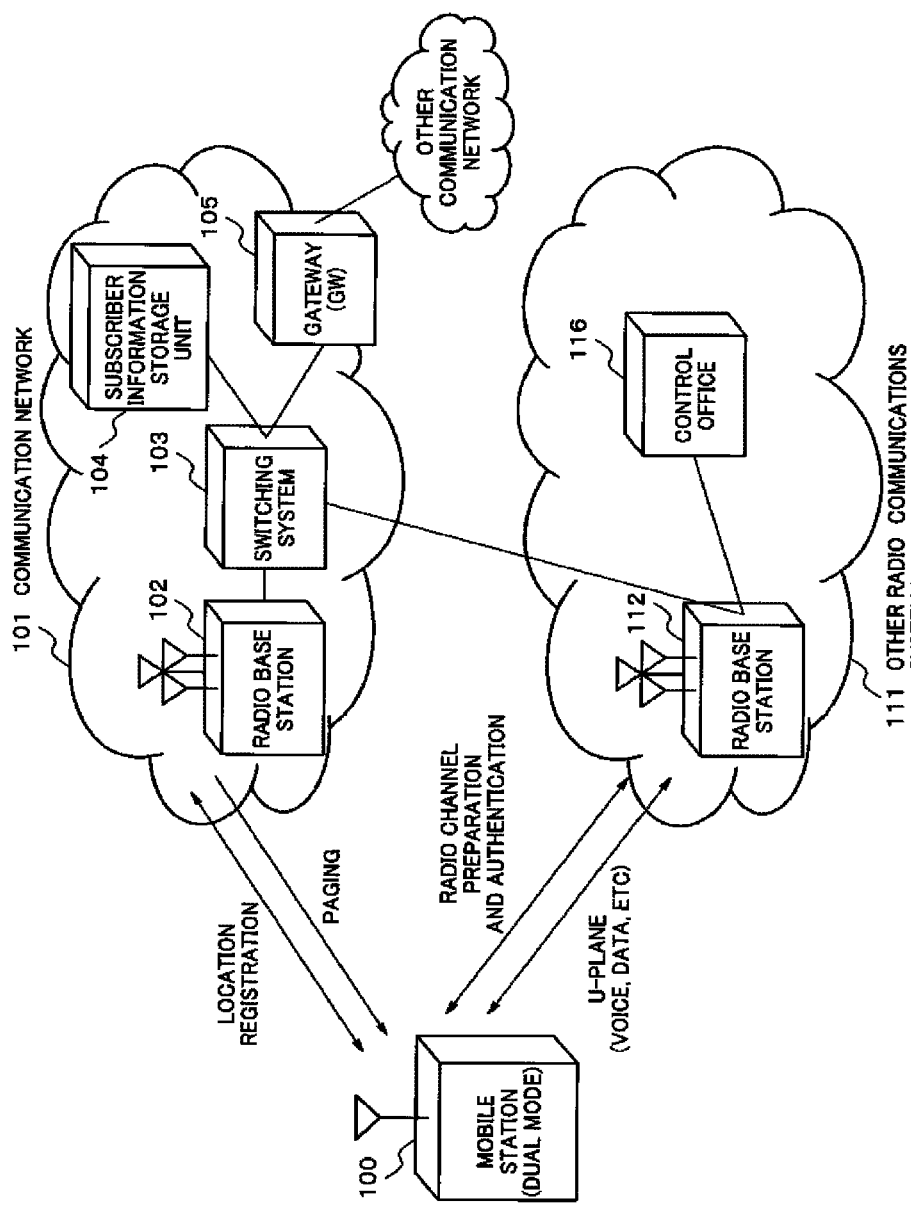
FIG. 6 is a figure showing an example of a system by which another exemplary embodiment of the present invention is applied.

In FIG. 6, the same numeral shows an equivalent portion in FIG. 1. When FIG. 6 is referred to, the radio base station 112 in other radio communication system network 111 is directly linked with the switching system 103 in the communication network 101, and other nodes are omitted for constituting the network to be simple.

In the foregoing explanation, communication network 101 and communication network 111 of FIG. 1 are assumed that the different network operators manage respective networks. However, the communication network 101 and other radio communication system network 111 in FIG. 6 are assumed to be managed by the same network operator. The numeral 116 indicates a control office and the function will be mentioned later.

In composition of FIG. 6, the operation of the call, which has been originated from other communication network 121, and is connected with mobile station 100 using the radio channel of other radio communication system network 111, will be explained with referring to the sequence chart of FIG. 7.

Figure 7:
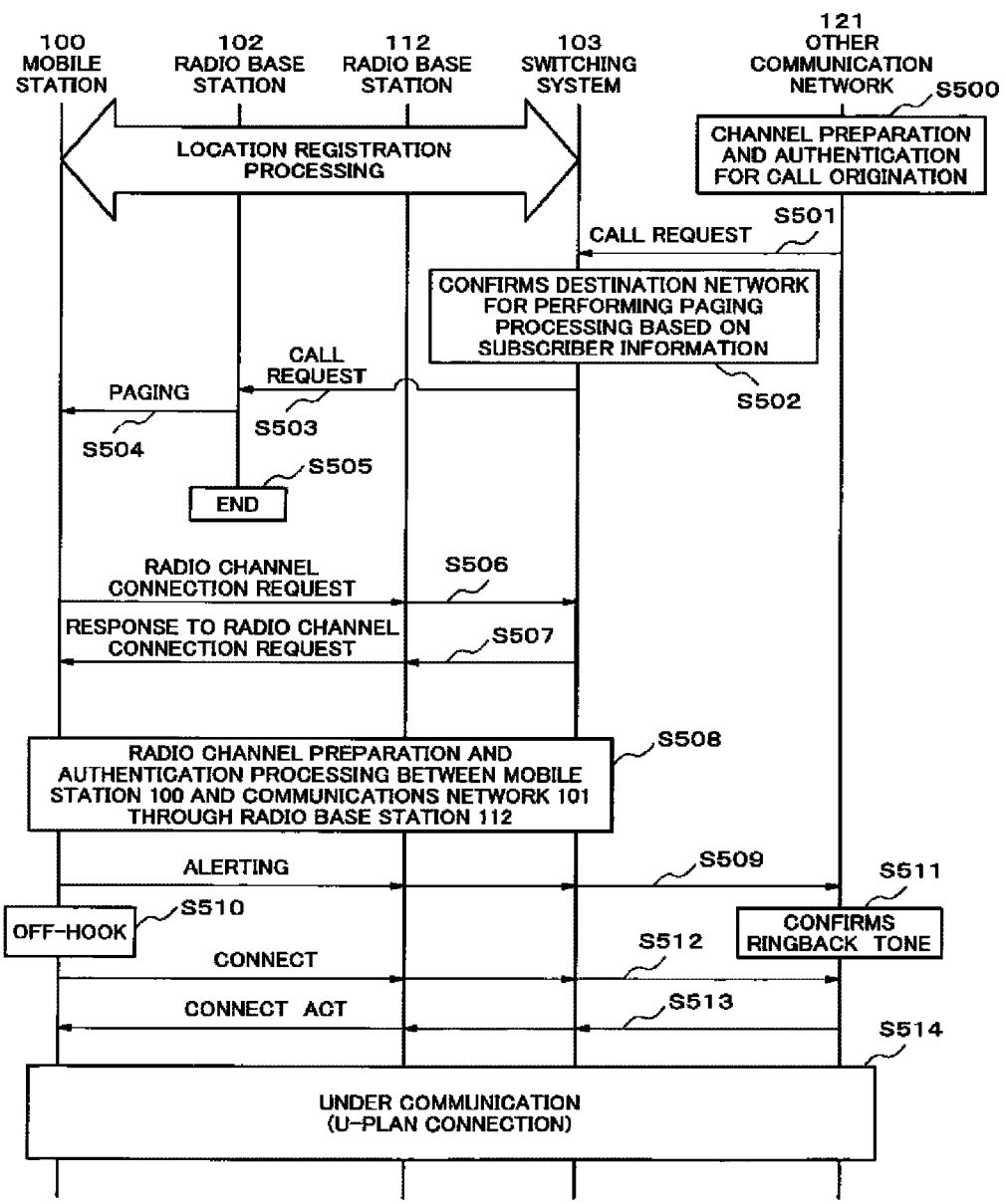
FIG. 7 is a sequence chart showing an operation of a call originated from other communication network 121, in FIG. 6, is connected with the mobile station 100 using a radio channel of other radio communication system network 111.

In FIG. 7, other communication network 121, which has performed channel preparation and authentication processing for a call originating terminal, which is not shown in the figure (Step S500), transmits a call request message to the switching system 103 through the gateway 105 (Step S501). Upon receiving the call request message, the switching system 103 confirms radio communication system and location registration area for performing paging processing based on the subscriber information, included in the call request message (Step S502), and the call request message is transmitted to the radio base station 102 (Step S503).

The radio base station 102 transmits a paging message to the mobile station 100 (Step S504), and completes its processing (Step S505).

When the mobile station 100 has received the paging message, it selects an optimal communication system for the call, and if the radio communication system network 111 is selected as the optimal system due to a reason such as cheaper communications fee or some other factors, the mobile station 100 transmits a radio channel connection request message to the switching system 103 (Step S506) through the radio base station 112. In this example, information of communication fee or other factors, or attributions for selecting respective communication system shall be memorized in the memory 14 in the mobile station 100.

After receiving the response to radio channel connection request message from the switching system 103 (Step S507), preparation of the radio channel and authentication processing are performed between the mobile station 100 and the switching system 103 (Step S508) using the radio communication system of the radio base station 112. Then, an alerting message is returned from the mobile station 100 to other communication networks 121 of the call origination (Step S509), and the ringback tone is confirmed by a call originating terminal (Step S511).

When the call is answered by an off-hook at the mobile station 100 (Step S510), a connect message (CONNECT) is transmitted (Step S512) and a response to connect message (CONNECT ACT.) is returned (Step S513). And, End to End communication connection is established between the mobile station 100 and a call originating terminal, and transmission and reception of voice data or user data is performed through the U-plane connection (Step S514).

Figure 8A:
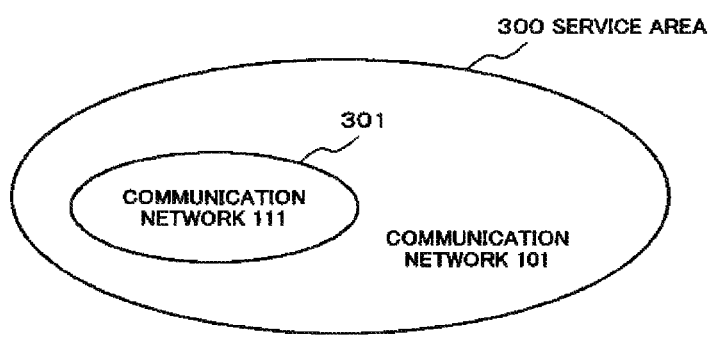
FIG. 8 (*a*) and FIG. 8 (*b*) are figures showing respective relations of service areas of communication networks 101 and 111 of the embodiment shown in FIG. 1.
Figure 8B:
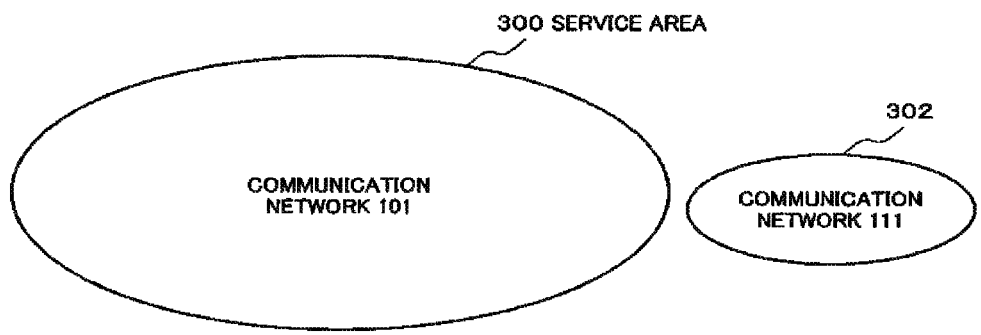

FIG. 8(a) and FIG. 8(b) are figures showing respective relations of service areas of communication networks 101 and 111 of the embodiment shown in FIG. 1. As shown in FIG. 8(a), it assumes that service area 300 of communication network 101 includes service areas 301 of communication network 111. However, as shown in FIG. 8(b), it assumes that service area 300 of communication network 101 does not include service areas 302 of communication network 111. If the service area 300 does not include service area 302 as shown in FIG. 8(b), it is necessary to perform location registration and standby processing for paging reception in the service area 302 for allowing call termination in this area.

Then, control office 116 shown in FIG. 6 is provide, and this control office 116 has the function to perform controls whether location registration is to be carried out and paging message transmission is to be carried out by radio base station 112 depending on the location where the radio base station 112 is installed. The radio base station 112 has a function to notify the mobile station 100 to perform location registration and paging reception according to instructions from the control office 116. Therefore, in this example, although the mobile station locates outside of service area of the communication network 101, if it locates in a service area of other radio communication system network 111, it is possible to receive call termination. On the contrary, call termination in quiet public places, such as a library and a teahouse, is to be restricted even if it is in a service area of other radio communication system network 111, and it is possible to restrict location registration and paging reception by control of the control office 116 according to the present invention.

The previous description of embodiments is provided to enable a person skilled in the art to make and use the present invention. Moreover and various modifications to these embodiments will be readily apparent to those skilled in the art and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents.

Further and it is noted that the inventor's intent is to refrain all equivalents of the claimed invention even if the claims are amended during' prosecution.

What is claimed is:

1. A mobile station for a mobile communication system which supports a procedure for the mobile station connected to a first communication system which comprises a first network node, to use a second communication system which comprises a second network node, the mobile station comprising:

a receiver configured to receive a paging message from a base station connected to the first network node, the first network node having received a request message from the second network node, the second network node having received a voice call and responded to receipt of the voice call by sending the request message to the first network node; and a transmitter configured to transmit, to the second network node, a message which responds to the paging message, wherein the mobile station requests a unified location registration for the procedure with only the first communication system from among the first communication system and the second communication system, wherein the mobile station establishes a connection with the second network node, wherein the first communication system operates a first radio technology and the second communication system operates a second radio technology different from the first radio technology.

2. The mobile station according to claim 1, wherein the second radio technology of the second communication system is wideband code division multiple access (W-CDMA).

3. The mobile station according to claim 1, wherein the second communication system further comprises a subscriber information storage, wherein the subscriber information storage stores information related to the first network node.

4. The mobile station according to claim 3, wherein the information related to the first network node indicates an association with the first network node.

5. The mobile station according to claim 1, wherein the paging message is transmitted after the unified location registration has been performed.

6. The mobile station according to claim 1, wherein the unified location registration comprises a location registration for the first communication system and a location registration for the second communication system.

7. The mobile station according to claim 1, wherein the mobile station establishes the connection with the second communication system using the unified location registration.

8. A mobile station for a mobile communication system which supports a procedure for the mobile station connected to a first communication system which comprises a first network node, to use a second communication system which comprises a second network node, the mobile station comprising:

a receiver configured to receive a paging message from a base station connected to the first network node, the first network node having received a request message from the second network node, the second network node having received a voice call and responded to receipt of the voice call by sending the request message to the first network node; and a transmitter configured to transmit, to the second network node, a message which responds to the paging message, wherein the mobile station requests a unified location registration for the procedure with the first communication system and has not requested a unified location registration for the procedure from the second communication system, wherein the mobile station establishes a connection with the second network node, wherein the first communication system operates a first radio technology and the second communication system operates a second radio technology different from the first radio technology.

9. The mobile station according to claim 8, wherein the second radio technology of the second communication system is wideband code division multiple access (W-CDMA).

10. The mobile station according to claim 8, wherein the second communication system further comprises a subscriber information storage,
wherein the subscriber information storage stores information related to the first network node.

11. The mobile station according to claim 10, wherein the information related to the first network node indicates an association with the first network node.

12. The mobile station according to claim 8, wherein the paging message is transmitted after the unified location registration has been performed.

13. The mobile station according to claim 8, wherein the unified location registration comprises a location registration for the first communication system and a location registration for the second communication system.

14. The mobile station according to claim 8, wherein the mobile station establishes the connection with the second communication system using the unified location registration.

15. A method for a mobile station in a mobile communication system which supports a procedure for the mobile station connected to a first communication system, which comprises a first network node, to use a second communication system, which comprises a second network node, the method comprising:
receiving a paging message from a base station connected to the first network node, the first network node having received a request message from the second network node, the second network node having received a voice call and having responded to receipt of the voice call by sending the request message to the first network node; and
transmitting, to the second network node, a message which responds to the paging message,
wherein the mobile station requests a unified location registration for the procedure with only the first communication system from among the first communication system and the second communication system, wherein the mobile station establishes a connection with the second network node,
wherein the first communication system operates a first radio technology and the second communication system operates a second radio technology different from the first radio technology.

16. The method according to claim 15, wherein the second radio technology of the second communication system is wideband code division multiple access (W-CDMA).

17. The method according to claim 15, wherein the second communication system further comprises a subscriber information storage,
wherein the subscriber information storage stores information related to the first network node.

18. The method according to claim 17, wherein the information related to the first network node indicates an association with the first network node.

19. The method according to claim 15, wherein the paging message is transmitted after the unified location registration has been performed.

20. The method according to claim 15, wherein the unified location registration comprises a location registration for the first communication system and a location registration for the second communication system.

21. The method according to claim 15, wherein the mobile station establishes the connection with the second communication system using the unified location registration.

22. A method for a mobile station in a mobile communication system which supports a procedure for the mobile station connected to a first communication system, which comprises a first network node, to use a second communication system, which comprises a second network node, the method comprising:
receiving a paging message from a base station connected to the first network node, the first network node having received a request message from the second network node, the second network node having received a voice call and responded to receipt of the voice call by sending the request message to the first network node; and
transmitting, to the second network node, a message which responds to the paging message,
wherein the mobile station requests a unified location registration for the procedure with the first communication system and does not perform location registration for the procedure with the second communication system, wherein the mobile station establishes a connection with the second network node,
wherein the first communication system operates a first radio technology and the second communication system operates a second radio technology different from the first radio technology.

23. The method according to claim 22, wherein the second radio technology of the second communication system is wideband code division multiple access (W-CDMA).

24. The method according to claim 22, wherein the second communication system further comprises a subscriber information storage,
wherein the subscriber information storage stores information related to the first network node.

25. The method according to claim 24, wherein the information related to the first network node indicates an association with the first network node.

26. The method according to claim 22, wherein the paging message is transmitted after the unified location registration has been performed.

27. The method according to claim 22, wherein the unified location registration comprises a location registration for the first communication system and a location registration for the second communication system.

28. The method according to claim 22, wherein the mobile station establishes the connection with the second communication system using the location registration.

* * * * *